United States Patent [19]

Huber

[11] Patent Number: 4,819,234
[45] Date of Patent: Apr. 4, 1989

[54] OPERATING SYSTEM DEBUGGER

[75] Inventor: William S. Huber, Needham, Mass.

[73] Assignee: Prime Computer, Inc., Natick, Mass.

[21] Appl. No.: 46,082

[22] Filed: May 1, 1987

[51] Int. Cl.[4] .............................................. G06F 11/00
[52] U.S. Cl. ......................................... 371/19; 371/16; 364/200
[58] Field of Search ..................... 371/16, 19; 364/200

[56] References Cited

U.S. PATENT DOCUMENTS

| | | | |
|---|---|---|---|
| 3,937,938 | 2/1976 | Matthews | 371/19 |
| 4,308,581 | 12/1981 | Raghunathan | 364/200 |
| 4,482,953 | 11/1984 | Burke | 364/200 |
| 4,635,193 | 1/1987 | Moyer et al. | 364/200 |
| 4,635,258 | 1/1987 | Salowe | 371/16 |
| 4,675,646 | 6/1987 | Lauer | 371/19 X |

OTHER PUBLICATIONS

"Debugging and Monitoring", *Communications of the CACM*, Jan. 1978, vol. 21, p. 89.
"Exceptions Occurring as the Consequence of an Instruction Start", *VAX11 Architecture Handbook*, Digital, pp. 304–313.
*VAX11 780 Technical Summary*, Digital, pp. 4-22-4-23.

*Primary Examiner*—Charles E. Atkinson
*Attorney, Agent, or Firm*—Wolf, Greenfield & Sacks

[57] ABSTRACT

The invention is a debugger which is part of the operating system of a multi-programmable digital data processor with virtual memory. The debugger can identify and correct faults in an embedded operating system of a multi-programmable digital data processor having hardware-controlled process exchange. The debugger is capable of suspending and effectively restarting processes in a primary or second central processing unit, as well as selectively accessing, reading, and/or modifying data at real or virtual memory locations. Further, the debugger can look ahead, using a next instruction prediction function, and determine the location of the next-to-be executed instruction. The debugger can then replace the previous breakpoint with the instruction the break point had originally replaced, and put the breakpoint after the next-to-be executed instruction. The debugger is also capable of simulating the local execution of a replaced instruction and restarting suspended processes. In this way the debugger can be used in single-step fashion to cause process suspension after every instruction in a sequence of code.

28 Claims, 4 Drawing Sheets

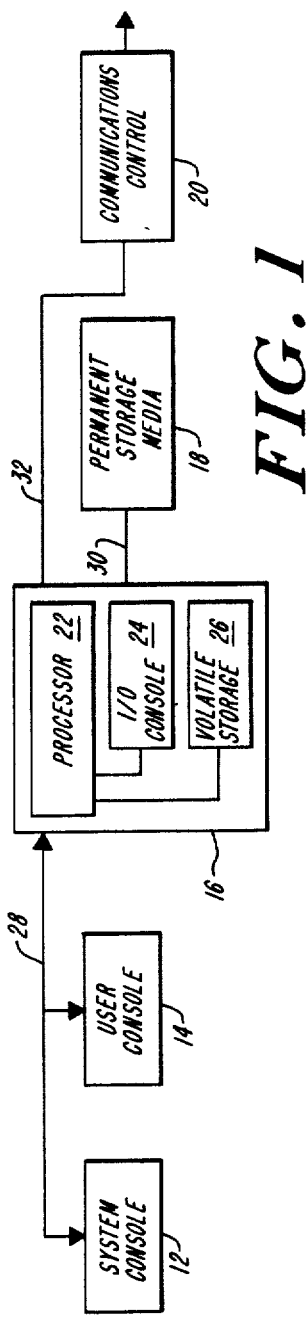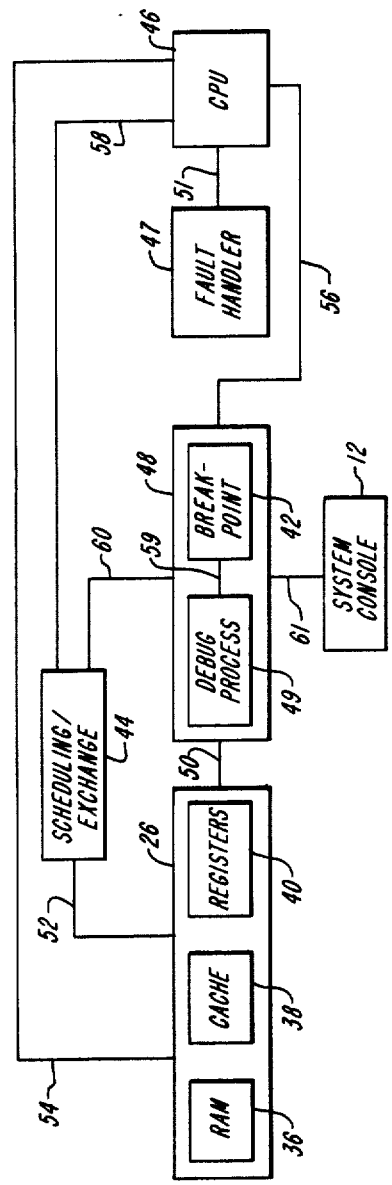

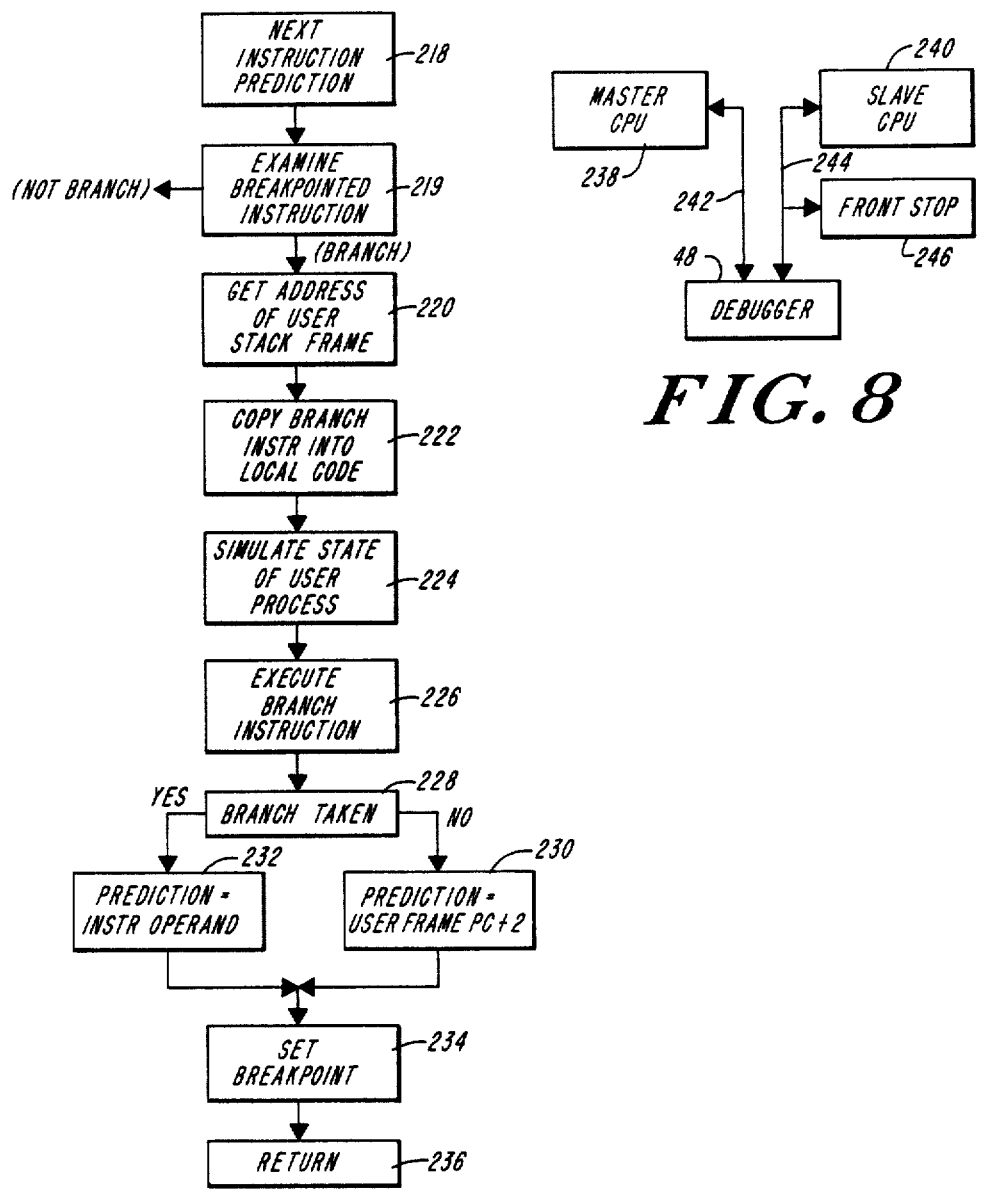

OPERATING SYSTEM DEBUGGER

BACKGROUND OF THE INVENTION

This invention is directed to the field of digital data processing and, more particularly, to the field of localizing and correcting faults in the operation of multiprogrammed digital data processing systems.

A conventional computer system operates under the control of a collection of programs known as an "operating system" which provides an interface between machine hardware of the host computer and user programs being processed by that computer. An important aspect of the interface is the control of allocation of physical computer resources, including the program and data stores, the central processing unit, and the input/output devices.

Among the various types of operating systems provided in the art is the so-called "multiprogrammed" operating system. In such a system, the host computer concurrently maintains several user programs in main storage and allocates the central processor to each of those programs on an alternating basis. More particularly, as the host computer runs, its operating system dedicates system resources to each process for a brief period of time, termed a "time slice." In carrying out this task, the operating system must save state information for each process awaiting execution, while storing in the registers and cache state information for the process which is presently active.

While on many machines the swapping of processes is done entirely in software, on some machines, e.g., the Series 50 computer systems manufactured by the assignee hereof, Prime Computer, Inc. of Natick, Mass., process exchange is done in hardware or, more specifically, through action of system microcode.

With reference to another aspect of operation, computers may have an architecture which provides an "embedded" operating system. In such a system, the address space of all processes, e.g., user programs, includes a single, shared copy of the operating system code. Within these systems, each user process executes a procedure call whenever it desires to execute a portion of the shared operating system code. Such a procedure call is identical to that used by the user process to execute its own subroutines.

With this background, an object of the invention is to provide an improved digital data processing system. More particularly, an object of the invention is to provide a digital data processing system with improved fault detecting capabilities.

Further, an object of the invention is to provide a mechanism for identifying and correcting faults in an embedded operating system of multiprogrammable digital data processor having hardware-controlled process exchange.

Still further, an object of the invention is to provide an improved system of the type described above in which process operation can be suspended at designated points in the instruction sequence.

Other objects of the invention are evident in the discussion which follows.

SUMMARY OF THE INVENTION

The aforementioned objects are attained by the invention which provides, in one aspect, an improved multiprogrammable digital data processor including a memory element, a breakpoint setting element, a scheduler element, a central processing unit, and a debugger element. The first element, the memory element, includes addressable locations for storing process code signals associated with each of one or more processes residing on the system. The process code signals of each process include signals representative of at least one of instructions, data, and state values associated with the process.

By way of example, in the illustrated embodiment, the memory element includes the main memory, as well as its cache memory and processor registers. The process code signals associated with each process may include, for example, instructions which are to be executed by the process, along with the process control information, including register values, program counter information, and other state information.

The breakpoint setting element replaces those signals in the memory register element representative of a selected instruction with signals representative of a selected interrupt instruction. For example, in the illustrated embodiment, the breakpoint setting element can be used to replace a given instruction, e.g., a register increment instruction, maintained in the user or operating system code with an interrupt-invoking instruction, e.g., one for causing a system fault.

The aforementioned scheduler element schedules one of the resident, waiting processes for execution during a designated time interval. That is, the element makes one of those processes active.

The central processing unit is coupled to the memory register element and to the scheduler element for normally executing code associated with the scheduled process continuously during the designated time interval. The central processing unit can also include an element for executing the aforementioned interrupt instruction to produce a selected fault signal.

The debugger element selectively suspends processing of the scheduled, or active, process by the central processing unit and permits selective access to locations of said memory unit for modifying or outputting values of signals stored in those accessed locations. A simulation element is provided for generating signals representative of simulation code. That code, which is relocatable, simulates the action of the replaced instruction. The simulation element itself includes an element for modifying, within the memory means, process code associated with the suspended process. Specifically, the element modifies the code to include the simulation code.

The debugger element further includes a restart element for reactivating the suspended process for execution of at least said simulation code.

In another aspect, the invention provides a processor of the type described above wherein the debugger element includes an element responsive to the selected interrupt signal for inhibiting the scheduling element from scheduling any other process for execution. Further according to this aspect of the invention, the restart element includes an element for re-enabling the scheduling element to schedule for execution said other processes.

In yet another aspect of the invention, there is provided a digital data processor of the type described above including a fault handler element for generating and storing, in said memory element, stack frame signals representative of a state of the scheduled process immediately subsequent to execution of the debug interrupt instruction. The fault handler element further includes an element for generating a debugger start-up signal, while the debugger element includes an element responsive to that signal for commencing operation.

Another aspect of the invention provides a process as described above wherein the debugger element includes a single-step element for reinstituting a replaced instruction and for replacing a next instruction with the selected interrupt instruction. By way of example, in the illustrated embodiment, the single-step element may be invoked to cause process suspension after every instruction in a sequence of code.

Accordingly to still another aspect of the invention, the single-step element can include an element for predicting the location of the next instruction to be executed within the memory element.

Still further, an aspect of the invention provides the improvement wherein the next instruction prediction element includes an element for simulating local execution of the replaced instruction.

Still further aspects of the invention are directed to the method of operation of a debugger of the type described above.

The above aspects, as well as others, are evident in the description which follows.

BRIEF DESCRIPTION OF THE DRAWINGS

A more complete understanding of the invention is provided by the drawings, in which:

FIG. 1 depicts a processing environment of the type in which the invention is practiced.

FIG. 2 depicts an architecture of a debugging apparatus constructed in accord with a preferred practice of the invention.

FIG. 7 depicts a preferred sequence utilized in performing next instruction prediction.

FIG. 8 depicts a dual processor system including a debugger configured in accord with one preferred practice of the invention.

DESCRIPTION OF THE ILLUSTRATED EMBODIMENT

I. General Description

Figure 3:
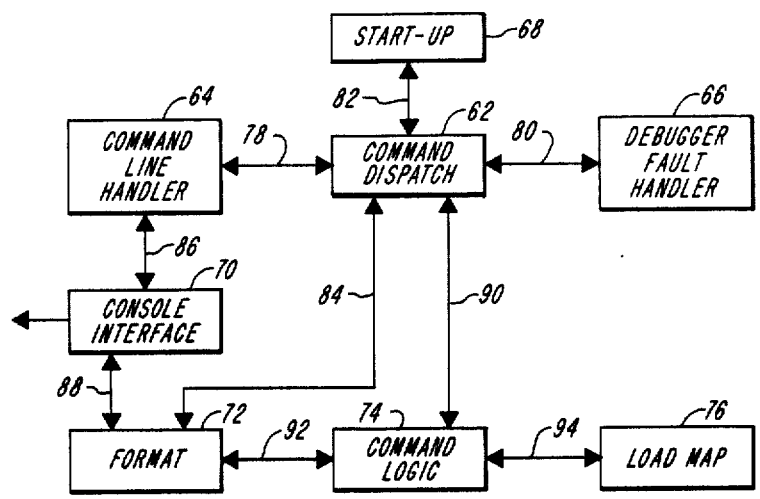
FIG. 3 presents an upper-level block functional diagram of a debugger constructed according to a preferred practice of the invention.

The process of isolating and correcting mistakes in computer programs is known as debugging, while the apparatus which facilitates that action is known as a debugger. Such apparatus typically features the ability to examine and modify either the main memory or the registers of the host computer system.

An essential requirement of any debugger is that it provide a breakpoint facility, i.e., the capability to temporarily suspend process execution at a specified instruction location. For example, it may be discovered that a particular user process fails repeatedly upon invoking the operating system page fault sequence.

In order to locate the exact cause of such error, the operator may utilize a debugger constructed in accord with the invention to identify the state of the system at the time the page fault sequence is invoked. Such identification is specifically carried out by using the debugger to set a breakpoint, for example, at the address of the first instruction of the page fault sequence. Upon executing the breakpointed instruction, the system will suspend the state of the executing process and transfer control to the debugger to permit the operator to interrogate and modify system values.

In providing breakpointing, a debugger constructed in accord with the invention includes a mechanism for overwriting an existing instruction with a special interrupt instruction, i.e., one which causes a machine fault or trap upon execution by the central processing unit. A debugger constructed in accord with the invention also provides a mechanism for executing a breakpointed instruction without deleting the breakpoint—that is, without deleting the substituted interrupt instruction. Unlike various prior art systems, the illustrated debugger provides such capability without hardware support.

Those skilled in the art will appreciate the inherent difficulties presented when attempting to implement a debugger on a machine having an embedded operating system. Generally, such difficulties are understood to arise because multiple processes may execute a breakpointed section of code at the same time. For example, if a first process executes a breakpoint and reinstitutes the original breakpointed instruction, a second process executing that same code might inadvertently cause execution of the reinstituted instruction code without invoking the debugger. This would result, of course, because the breakpoint had previously been removed—albeit temporarily—by the first process. This type of erroneous behavior, i.e., that occurring where the order of scheduling two processes affects the results, is referred to as a race condition.

A debugger constructed in accord with the invention permits breakpointing and avoids race conditions within embedded operating system code through utilization of a debugger element which is independent of operating system code and which executes at the highest priority provided by the system. Such a debugger relies on the breakpointed process, i.e., the user process which executed the breakpoint interrupt, to execute code which will simulate the effect of executing the original breakpointed instruction.

II. The Data Processing Environment

FIG. 1 depicts a digital data processing system providing an environment for practice of the invention. The system 10 is comprised of a system console 12, a user console 14, digital computer 16, secondary, permanent storage media 18, and communications control device 20. The digital computer 16 includes a processor 22, an input/output control section 24, and volatile storage 26. Digital computer 16 is coupled with consoles 12, 14 by way of bus 28, while being coupled with storage media 18 and control 20 by way of lines 30 and 32, respectively.

In the illustrated embodiment, system console 12 is a dedicated terminal configured for running high-priority system functions, e.g., system "boots" for initiating computer operation. User console 14 represents any of numerous user terminals which may be connected to the computer 16 for running both general and high-priority tasks. Permanent storage device 18 represents any of one or more disk drives, tape drives, and other permanent storage apparatus which are well known in the art. Control element 20 represents standard communications device including, for example, a network interface.

Apart from the improvements described herein, digital computer 16, including processor 22, input/output control 24, and volatile memory 26, may be of conventional construction, configuration, and operation. Preferably, the computer 16 operates with an embedded operating system and includes a microcode-based process exchange mechanism. A Preferred system for use in construction and operation of the illustrated embodiment of the invention is the Series 50 computer manufactured by the assignee hereof, prime Computer, Inc., of Natick, Mass., operating with version 20.1 of the PRIMOS (Trade Mark of Prime Computer, Inc., Natick, Mass.) operating system.

FIG. 2 illustrates a configuration for a digital computer 16 operating in accord with a preferred practice of the invention. As shown, the volatile storage area 26 includes random access memory unit 36, cache memory 38, and registers 40. The computer 16 also includes scheduling and exchange element 44, central processing unit (CPU) 46, system fault handler 47, and debugger 48. Debug element 48 includes breakpoint element 42 and debug process 49.

Bus line 50 provides communication between the debugger 48 and the storage area 26, while signal transfers between the storage area 26 and the scheduler/exchanger 44 are handled along line 52. Transfers between the CPU 46 and each of the storage area 26, the debugger 48, and the scheduler/exchanger 44 are carried out along lines 54, 56, and 58, respectively. Communications between the debug process 49 and the breakpoint element are effected along communications path 59, as shown. The scheduler/exchanger 44 communicates with the debugger 48 on line 60, as shown, while that latter unit communicates with the system console via line 61. Path 51 provides a communications link between CPU 46 and system fault handler 47.

In a preferred embodiment, central processing unit 46, scheduling-exchange element 44, and volatile storage area 26, including random access memory 36, cache memory 38, and registers 40, are provided as standard components of the assignee's aforementioned Series 50 computer. The construction and interaction of the breakpoint and debugger elements 42, 48 with that computer are discussed below.

The system fault handler 47 used in a preferred embodiment of the invention is provided as a standard component of the operating system of the aforementioned Series 50 computer. The fault handler 47 is invoked by action of the CPU 46, for example, when code executing therein cannot complete a task without special help. In this regard, see chapter 10 of the document *DOC9473-LLA System Architecture Guide Revision* 19.4. filed herewith as Appendix A (available in the application file history). By way of example, the fault handler 47 responds to page fault—which occurs when the CPU 46 attempts to reference memory not currently resident in main memory 26—by invoking a routine to read further data from the disk drive 18.

In the illustrated embodiment, the system fault handler 47 is arranged for responding to the execution of a debug fault instruction by the CPU 46 for invoking a debug start-up element, discussed below. The instruction chosen for initiating a debug fault has no instruction mnemonic since architecturally it is classified as an illegal instruction. This instruction, opcode 1703 octal, will henceforth be identified as the BRKPT instruction. A preferred software embodiment of the system fault handler 47 is provided in Appendix C (available in the application file history) at pp. 681-683.

FIG. 3 depicts a configuration for debugger 48 constructed according to a preferred practice of the invention. In particular, the debugger 48 includes a command dispatch element 62, a command line handling element 64, a fault handling element 66, a start-up element 68, a console interface logic element 70, an output format element 72, a command logic element 74, and a load map element 76. The command dispatch element 62 communicates with each of elements 64, 66, and 68 via lines 78, 80, and 82 respectively. The handler 64 transfers signals with the console interface 70 on line 86, while that latter element transfers signals with the format element 72 via line 88, as shown. Communications between the command logic 74 and each of elements 62, 72, and 76 are carried out over lines 90, 92, and 94, respectively.

The start-up element 68 initiates operation of the debugger 48. The element 68 may be invoked by the operating system of the host computer upon execution of a breakpoint instruction, upon interruption by the system console, or upon the execution of page faults. Generally, the start-up element provides functionality for saving information regarding the state of the user process from which the debugger was invoked, and for notifying the command dispatch element 62 to begin operation of the debugger process. The start-up element is also responsible for suspending process execution of a second, or "slave," processor of a dual processor system prior to initiating the debugger 48.

In addition to being operable on single processor computer systems of the type shown in FIGS. 1 and 2, the illustrated debugger 48 is also operable for execution on host computer systems having dual processors, e.g., the Model 850 system of the Series 50 computers manufactured by the assignee hereof, Prime Computer, Inc. The Model 850 system is a tightly coupled shared memory dual processor computer system in which processes can execute on either processor. However, only the "master" processor can execute input/output instructions, while the "slave" processor cannot. Accordingly, the illustrated debugger 48 executes in conjunction with the master processor, while issuing an instruction sequence to suspend further processing by the slave processor. In this regard, it will be noted that a user process executing on either processor may execute breakpointed code which initiates action of the debugger 48.

A dual processor arrangement of the type referred to above is shown in FIG. 8. In particular, a master central processing unit 238 and a slave central processing unit 240 are coupled for communication with a debugger element 4B by paths 242 and 244. An additional element, the front stop element 246 is also coupled with the slave CPU 240 and the debugger 48 via path 244.

In order to synchronize operation on the illustrated dual processor system, the debugger 48 employs a "front stop" element 46 to inhibit operation of the slave processor during execution of the debugger process on the master processor. In a preferred embodiment, the front stop element 46 comprises an instruction sequence which places the slave processor 240 in a continuous loop. Preferably, the element 46 is configured as the highest priority process capable of executing on the slave CPU 240, thereby preventing any other processes from being scheduled for execution by that processor 240 during execution of the debugger process 49 on the master CPU 238.

A preferred software embodiment of the start-up element is provided in Appendix C (available in the application file history) at pp. 250-254.

The dispatcher 62 serves as the main execution loop for the debugger 48. Its role is to read in a command line, to determine if a valid command has been entered, and to transfer control to appropriate elements for processing each given command. Before executing the aforementioned processing loop, the dispatcher 62 determines how the debugger was invoked, e.g., as a result of a breakpoint or system console command. If invoked as a result of a breakpoint or single step, an update routine is called to update breakpoint tables and decide whether to enter debugger command environment or, simply, to return to the host computer operating system.

A preferred software embodiment of the dispatcher 62 is provided in Appendix C (available in the application file history) pp. 281-294.

The command logic 74 contains routines that perform the specific functions requested from the debugger command environment. All such routines have logic to parse the tokens remaining in the command line read in by the dispatcher 62.

The debugger 48 employs the command line handler 64 and system console interface 70 to read from and write to the system console 12. The command line handler employs codes to support echoing, buffering, erase and kill characters, XON-XOFF, and quit handling. In order to permit the later two functions, the interface 70 continually polls the console 12 for input.

A preferred software embodiment of the command line handler 64 is provided in Appendix C (available in the application file history) at pp. 766-769, and pp. 197-200, while a preferred software embodiment of the system console interface 70 is provided in Appendix C (available in the application file history) at pp. 102-107.

Insofar as a debugger 48 constructed in accord with a preferred embodiment of the invention does not rely on services provided by the operating system of the host computer 16, the debugger 48 must have its own fault handler 66. This fault handler 66 is to be considered distinct from the host computer operating system fault handler 47 referred to above. The debugger fault handler 66 prevents the debugger 48 from losing control of the central processing unit to the operating system of the host computer. To handle faults that occur while the debugger 48 is operating, a separate fault table is provided. This fault table causes control to pass to fault handler 66 whenever a fault is detected. Upon invocation, the primary job of this fault handler is to print error messages regarding the fault and to return control to the debugger 48. A preferred software embodiment of the fault handler 66 is provided in Appendix C (available in the application file history) at pp. 231-234.

Preferred software instruction sequences for the format element 72 are provided in Appendix C (available in the application file history) at pp. 416-444 and pp. 766-769, while a preferred instruction sequence for the load map element 76 is provided in Appendix C (available in the application file history) at pp. 456-470 and pp. 479-483.

III. Setting Breakpoints

An operating system debugger 48 constructed in accord with the invention executes breakpoints by replacing a normal operating system instruction with a fault instruction, specifically the debugger interrupt instruction, BRKPT. For example, an exemplary user process (i.e., a process other than the debugger process 49) may be configured to execute code as follows:

| | |
|---|---|
| LDA 2000 | (stored at address 4010) |
| A1A | (stored at address 4012) |
| STA 2002 | (stored at address 4014) | where, the LDA instruction loads the A register with the value stored at address 2000; the A1A instruction calls for incrementing the value stored in the A register by one; and the STA instruction calls for storing the value of the A register at address 2002.

Figure 5A:
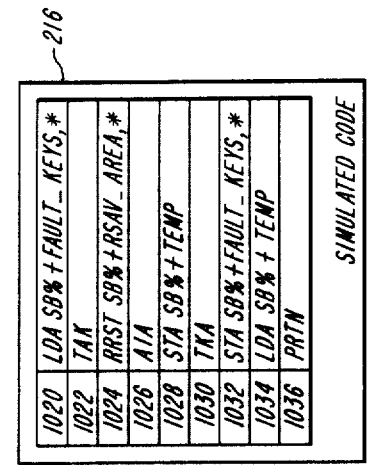
FIGS. 5A, 5B, and 5C depict the modification of user or system code effected by a debugger operating in accord with a preferred practice of the invention.

The illustrated system permits the operator to set breakpoints at points in the operating system code, e.g., that presented in FIG. 5A, through joint action of the debugger 48, including breakpoint element 42.

Figure 5B:
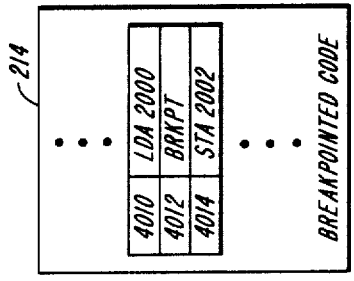

FIG. 5B, element 214, illustrates the effect of setting a breakpoint in the aforementioned exemplary code. Particularly, the modified operating system code shown in FIG. 5B includes the original "LDA 2000" instruction at address 4010, as well as the original "STA 2002" instruction at address 4014. The operating system code 212 also includes a debugger interrupt signal "BRKPT" stored at the address where the original increment instruction, "A1A", once resided.

The breakpoint element 42 is responsive to commands received from the debugger 48 for setting and removing breakpoint interrupt signals in the user or operating system code retained in the volatile storage area 26. In setting a breakpoint, the element 42 must locate in RAM 36 the instruction which the operator selects for breakpointing. At that location, the element 42 inserts a specified fault instruction, i.e., BRKPT. The original—now breakpointed—instruction is saved for use in generating the simulated code discussed below.

If an attempt is made to set a breakpoint at an instruction not resident in RAM, the breakpoint element 42 acts in combination with the debugger 48 to monitor the volatile memory 26 until the instruction of interest is "paged in" by the host computer operating system code, specifically, for example, by the operating system page fault routine. When the originally non-resident code is swapped into RAM 36, i.e., becomes "resident," the breakpoint element 42 can then install the BRKPT instruction.

A preferred software embodiment of the breakpoint element 42 is provided in Appendix C (available in the application file history) at pp. 133-145, 355-359, 390-395, and 798-857. A preferred software embodiment of the mechanism for flagging breakpoints on nonresident pages is provided in Appendix C (available in the application file history) at pp. 552-563 and pp. 512-519.

At the time a breakpoint is set, the breakpoint element 42 constructs a relocatable code sequence for execution by the user process. This relocatable code is stored in shared memory. In a preferred embodiment, the breakpoint element 42 creates the relocatable code from a template selected in accord with the type of the breakpointed instruction. Next, the element 42 and the debugger process 49 complete the template based on the specific type of the breakpointed instruction. In this manner, the debugger 48 tailors a simulated code sequence which will perform the same operation that the breakpointed instruction would have performed had it not been removed in favor of the interrupt instruction debugger writes instructions into each labeled field, e.g., the field MEMREF_IND_DISP.

| | | | |
|---|---|---|---|
| MEMREF_TEMPLATE | | EQU | * |
| | RRST | SB%+STARTUP_RSAV_AREA,* | |
| | | Ensure index registers are setup. | |
| MEMREF_EAXB_DISP | | EQU | *-MEMREF_TEMPLATE |
| | EAXB | SB%+STARTUP_BASE_REG,* | |
| | | Start with base reg value if not reg. trap, else LDA, tab sequence. | |
| MEMREF_EAL_DISP | | EQU | *-MEMREF_TEMPLATE |
| | LDA % | SB%+STARTUP_BASE_REG | |
| | | Overwrite this instruction with an EAL if not reg trap. | |
| | STL | SB%+STARTUP_TEMP | |
| | | Address of operand, almost. | |
| MEMREF_IND_DISP | | EQU | *-MEMREF_TEMPLATE |
| | BSZ | INDIRECT_CODE_LENGTH | |
| | | One word indirection code. | |
| | LDA | SB%+STARTUP_FAULT_KEYS,* | |
| | | Restore keys. | |
| | TAK | | |
| | RRST | SB%+STARTUP_RSAV_AREA* | |
| | | Restore registers. | |
| MEMREF_INST_DISP | | EQU | *-MEMREF_TEMPLATE |
| | BSZ | 1 | |
| | | The simulated instruction put here may be either 1 or 2 words long. | |
| | NOP | | |
| | STA | SB%+STARTUP_TEMP | |
| | | Need to use the A reg in order to save and return the value of the keys. | |
| | TKA | | |
| | STA | SB%+STARTUP_FAULT_KEYS,* | |
| | LDA | SB%+STARTUP_TEMP | |
| | PRTN | | |
| MEMREF_LENGTH | EQU | *-MEMREF_TEMPLATE | |

BRKPT.

A preferred template used to build simulated code for a majority of memory reference instructions is shown below. The sequence is written with the instruction set of the aforementioned Series 50 computers. Two documents entitled *DOC9474-ILA Instruction Sets Guide Revision* 19.4 and *UPD9474-13A Instruction Sets Update Revision* 20.1 providing a complete description of the instruction set are filed herewith as Appendix B (available in the application file history). The template is used in constructing all memory reference instructions of the aforementioned Series 50 computers, excepting those listed in Appendix C (available in the application file history), pp. 851-853. In completing the template, the The table below is utilized by breakpoint element 42 to fill in empty locations of the template at label MEMREF_IND_DISP. Specifically, the table contains the code needed to achieve one word indirection.

| | | | |
|---|---|---|---|
| INDIRECT_TAB | NOP | | Direct. |
| | NOP | | |
| | NOP | | |
| | NOP | | |
| | NOP | | |
| INDIRECT_CODE_LENGTH | | EQU *-INDIRECT_TAB | |
| | LDA% | SB%+STARTUP_TEMP,* | Indirect |
| | STA% | SB%+STARTUP_TEMP+1 | |
| | NOP | | |
| | TXA | | Postindexed |
| | ADD% | SB%+STARTUP_TEMP,* | |
| | STA% | SB%+STARTUP_TEMP+1 | |
| | LDA% | SB%+STARTUP_TEMP,* | Preindexed |
| | STA% | SB%+STARTUP_TEMP+1 | |
| | NOP | | |

Those skilled in the art will appreciate that a template of the type shown above for memory reference instructions is constructed to ensure that all references to code, including that not presently resident in main memory 36, are computed by the user process as it executes the relocatable code. Specifically, for example, the debugger 48 relies upon the operating system of the host computer to access non-resident memory.

A preferred template for use in generating simulated code for jump instructions is as follows:

| | | | |
|---|---|---|---|
| JUMPS_TEMPLATE | | EQU | * |
| | RRST | SB%+STARTUP_RSAV_AREA,* | |
| | | Ensure index registers are setup. | |
| JUMP_EAXB_DISP | | EQU | *-JUMPS_TEMPLATE |
| | | Start with base reg value if not reg | |

|   |   |   |
|---|---|---|
|   |   | -continued |
|   |   | trap, else 1da, tab sequence. |
|   | EAXB | SB%+STARTUP_BASE_REG,* |
| JUMP_EAL_DISP | EQU | *-JUMPS_TEMPLATE |
|   |   | Overwrite this instruction with an eal if not reg. trap. |
|   | LDA% | SB%+STARTUP_BASE_REG |
|   | STL | SB%+STARTUP_TEMP |
|   |   | Address of operand. Almost. |
| JUMP_IND_DISP | EQU | *-JUMPS_TEMPLATE |
|   | BSZ | INDIRECT_CODE_LENGTH |
|   |   | One word indirection code. |
|   | LDL | SB%+STARTUP_TEMP |
|   |   | Pickup operand address. |
|   | STLR | XB |
|   |   | Save location of dest for JST. |
| JUMP_JST_ADD | EQU | *-JUMPS_TEMPLATE |
|   | IAB |   |
|   | A1A |   |
|   | IAB |   |
|   |   | Add 1 to the destination to make execution start past the return address (JST only). |
|   | STL | SB%+STARTUP_PREV_PC,* |
|   |   | Make code jump to new destination. |
|   | LDL | SB%+STARTUP_BRKPT_ADDR |
|   |   | Determine return location. |
|   | IAB |   |
| JUMP_ADD_DISP | EQU | *-JUMPS_TEMPLATE |
|   | BSZ | 1 |
|   |   | Replaced by either A1A or A2A. |
|   | IAB |   |
|   | STL | SB%+STARTUP_TEMP |
|   |   | Now we have the return location. |
| JUMP_JST_SEQ | EQU | *-JUMPS_TEMPLATE |
|   | LDA% | SB%+STARTUP_TEMP+1 |
|   |   | These 2 instructions are only for JST's. Otherwise they are NOP'ed. |
|   | STA% | XB% |
|   | RRST | SB%+STARTUP_RSAV_AREA,* |
|   |   | Restore registers. |
| JUMP_LOAD-DISP | EQU | *-JUMPS_TEMPLATE |
|   | BSZ | 2 |
|   |   | Replaced by NOP's or a load. |
|   | PRTN |   |
| JUMPS_LENGTH | EQU | *-JUMPS_TEMPLATE |

Figure 4:
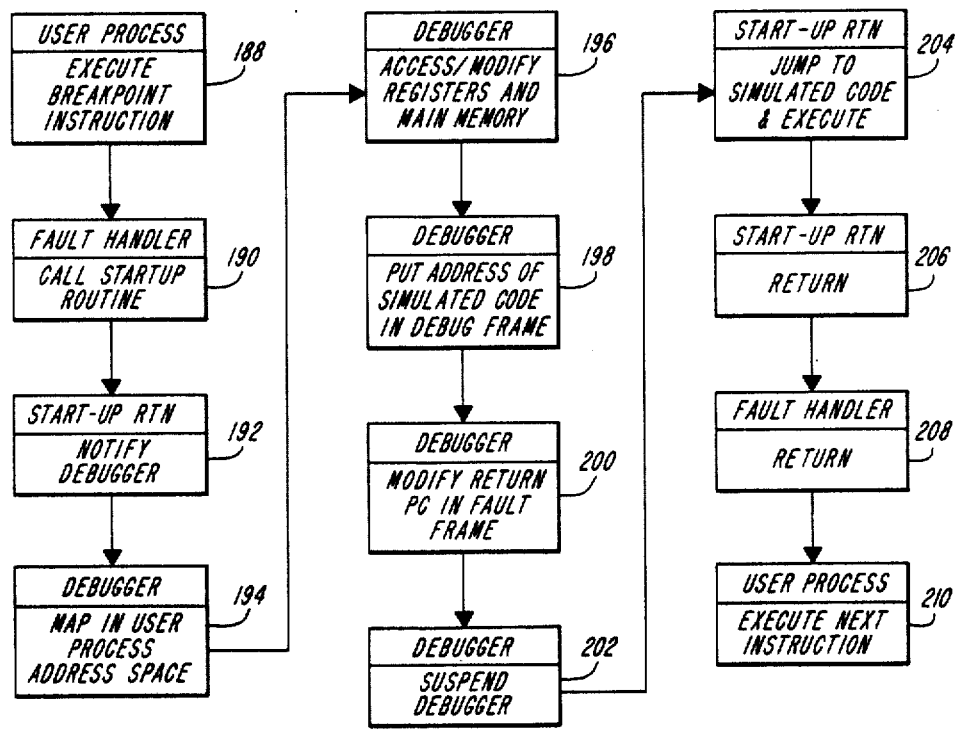
FIG. 4 depicts an operational sequence of a preferred breakpoint handling process.
Figure 5C:
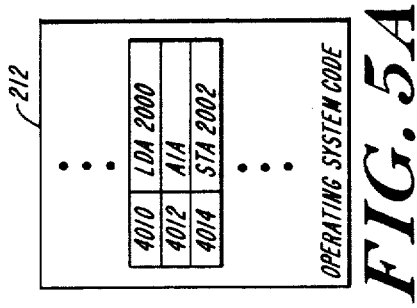

FIG. 5C illustrates simulated code generated by the debugger 48. In the illustration, the simulated code 216 provides, specifically, a relocatable instruction sequence for simulating action of the breakpointed instruction "A1A". The content of the sequence 216 may best be understood with reference to the state of the user process at the time the sequence is executed. In this regard, attention is directed to FIGS. 4 and 6.

Figure 6:
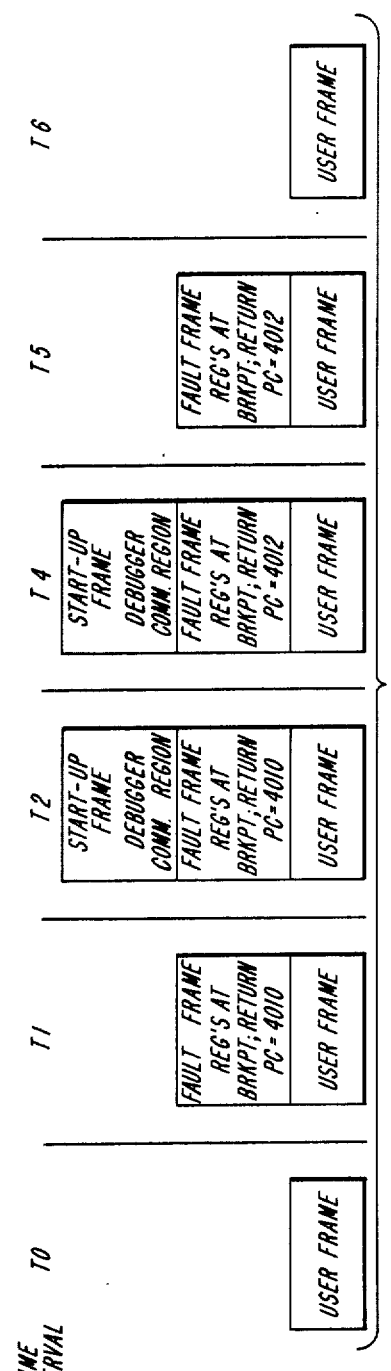
FIG. 6 depicts a user process stack frame sequence effected during operation of a preferred breakpoint sequence.

FIG. 4 depicts a sequence of steps carried out within digital computer 16 operating under control of host operating system code and with a debugger 48 constructed in accord with the invention. The sequence begins with the execution of breakpointed code of the type shown in FIG. 5B. At the outset, the processor 22 executes the LDA instruction stored at address 4010. Subsequently,, at step 188, the processor 22 executes the interrupt instruction BRKPT stored at address 4012. See FIG. 4, element 188. At the time of execution of the breakpointed instruction, the user process stack includes only one frame. The state of the system vis-a-vis stack frame content is shown in FIG. 6, time interval T0.

In response to the execution of the interrupt instruction, the processor 22, operating under control of the host operating system, invokes the system fault handler procedure, as shown in step 190. Upon invoking the system fault handler, a second frame is added to the user process stack. This frame, which is stored in volatile storage area 26, provides a temporary storage for all computations and process control actions taken by the system fault handler; see FIG. 6, time interval T1. The new stack frame, the fault frame, includes a return program counter directed to the breakpoint instruction of the original user process.

The system fault handler responds to execution of the debugger breakpoint instruction by calling the debugger start-up routine which, in turn, notifies the debugger 48, as shown in FIG. 4, element 192. Upon invocation of the start-up routine, a third stack frame is added to the user process stack; see FIG. 6, Time Interval T3. As before, the new stack frame is used for per process calculations and flow control. Additionally, however, the new stack frame effectively serves as a communications area for the debugger and the user process, particularly with regard to execution of the simulated code.

Upon invocation, the debugger start-up sequence stores in shared memory further information regarding the user process. The start-up sequence then issues a notify instruction to invoke the debugger process 49, while placing the user process in a suspended state. In the preferred, illustrated embodiment, the debugger process 49 is implemented as a separate, highest priority process within the PRIMOS TM operating system. In this role, the host computer resources, including particularly the system console and central processing unit, are uninterruptably dedicated to the debugger process.

Accordingly, the host computer, and specifically, the scheduling/exchange element, or dispatcher, is inhibited from scheduling further processes for execution.

At the outset, the debugger process 49 maps in the address space of the user process which executed the breakpoint; see FIG. 4, element 194. As shown by element 196, the debugger process 49 permits access to values stored in the system's volatile memory 26. Through use of the debugger command structure, the operator may effect the printing of selected ones of those values on the system console 12. Additionally, the operator may change selected values in the volatile memory by entering, for example, new values on the system console. Still further, the operator may set further breakpoints in operating system code, as well as placing the debugger in single-step mode. A document detailing features of a preferred debugger is provided in Appendix D (available in the application file history).

Referring to element 198, the debugger process 49 modifies the start-up frame to include the address of the code simulating the breakpointed instruction. See FIG. 4, element 198; FIG. 6, time interval T4. The purpose of this operation is to force the user process to execute the simulated code, thereby simulating action that the breakpointed instruction would have taken had it not been removed in favor of the interrupt instruction, BRKPT. In a preferred embodiment, the simulated code is executed by effecting a jump to the address where the simulated code is stored. As noted above, sample simulated code replacing the increment instruction "A1A" is shown in FIG. 5C.

Before returning control to the user process, the return program counter in the fault handler frame must be changed. As shown in FIG. 6, time interval T0, and in FIG. 5B, the debugger sequence was initiated upon the execution of the interrupt instruction, BRKPT, residing at address 4012. Subsequent to execution of the simulated code, and the "popping" of the startup and fault stack frames, it is essential that the user process continue through execution of the instruction following the interrupt. Accordingly, as one of its final acts, the debugger process 49 increments the return program counter in the fault stack frame to point to address 4014, the location where the "STA 2002" instruction resides in accord with the exemplary code shown in FIG. 5B.

As shown by element 202, the debugger process suspends itself, thereby permitting other processes, including the breakpointed user process, to be scheduled for execution.

As indicated by FIG. 4, when the previously suspended user process regains access to the CPU, it immediately executes a jump to the simulated code; see element 204. Preferably, the final instruction of the simulated code sequence is a procedure return, PRTN; see, for example, the instruction stored at address 1036 of instruction space 216 of FIG. 5C. See also FIG. 4, element 206. Execution of the return instruction effects removal of the start-up frame from the user stack. See FIG. 6, time interval T5.

Subsequently, the user process executes remaining portions of code provided in the fault handler sequence. Preferably, this code itself merely invokes a procedure return, thereby popping the fault frame from the user stack. See FIG. 4, element 208; and FIG. 6, time interval T6.

Control having returned to the original frame, the user process continues execution with the instruction following the breakpoint interrupt. Accordingly, the process flow continues with the exemplary next instruction, "STA 2002". See FIG. 4, element 210.

IV. Single Steps

In addition to permitting the setting of breakpoints at specific locations within the user or operating system code, the debugger 48 permits the operator to step through the code one instruction at a time. For example, if a particular section of code appears faulty, the operator may set an initial breakpoint to suspend execution at the beginning of the faulty sequence. Once the breakpoint is executed and control transferred to the debugger process 49, the operator may request that the debugger process 49 enter single-step mode, thereby effectively causing the processor to enter the debugger after the execution of each subsequent instruction.

In a debugger 48 constructed according to a preferred embodiment of the invention, single-stepping is effected by repeatedly removing, after execution, each breakpoint, while setting a new breakpoint at the next line of code. That is, once control is passed to the debugger process 49 in consequence to execution of a breakpoint interrupt, the breakpointed instruction is reinstituted and a new breakpoint is set at the next instruction. In this manner, the breakpoint interrupt is transferred from line to line within the executed code.

By way of example, referring to FIG. 5B and the discussion above, having received control after execution of the interrupt at address 4012, the debugger 48 effects single-stepping by first reinstituting the breakpointed instruction. This requires that the debugger 48 invoke the breakpoint module 42 for reinsertion of the breakpointed instruction, e.g., "A1A", at the address 4012. The debugger 48 then engages in a next instruction prediction sequence to determine which instruction the user process will execute upon return from the debugger. Upon making that prediction, the debugger process 49 invokes the breakpoint routine 42 to request the setting of a breakpoint at the next predicted instruction.

More particularly, after permitting accessing and modifying volatile storage with the debugger process 49, the debugger invokes the breakpoint element 42 to reinstitute the originally breakpointed instruction, as well as to set a breakpoint at the next predicted instruction. The debugger process 49 then enters the suspended state, via execution of a wait instruction, and returns control to the user process for execution of that reinstituted instruction. In the event that the original breakpoint was set by the user, and not the result of a single-step, the debugger returns control to the next predicted instruction via execution of simulated code, as discussed above.

A preferred sequence for next instruction prediction for branch instructions is provided in FIG. 7, beginning with element 218. At the outset, the prediction element examines the breakpointed instruction—that is, the instruction whose replacement has resulted in current invocation of the debugger. If the instruction is a branch instruction, the debugger transfers control to step 220.

At step 220, the debugger locates relevant portions of the user stack frame. Preferably, these portions include the program counter and the registers.

As indicated in step 222, the prediction element copies the branch opcode directly into the next prediction code itself.

As indicated in step 224, the prediction element loads register values for locally simulating the state of the user process. Where, for example, the branch instruction requires a branch based upon the value stored in the A register, the debugger 48 loads the value copied from the user process stack frame into the current register.

Subsequently, in step 226, the debugger executes a copy of the branch instruction, utilizing for an operand the local address of illustrated instruction 232.

the breakpoint element 42 is invoked to set a breakpoint at address 4012.

A preferred sequence executed by the debugger for next instruction prediction for branch instructions is shown below. Particularly, this sequence determines how flow control changes following a branch instruction.

```
                    DYNM     = 112
                                            Reset stack.
                    DYNM     INST(3)
                                            Instruction to relocate.
                    DYNM     STRT_FRAME(3)
                                            Process startup stack frame.
                    DYNM     BRAN_TEMP(2)
NEXT_BRAN
ECB                 BRA-
                    N_S-
                    TART-
                    , INST,
                    2
BRAN_START          ARGT                    (inst, strt_frame)
*Use the LB register to reference the process's startup stack frame.
                    LDL      STRT_FRAME,*
                    STL      BRAN_TEMP
                    EALB     BRAN_TEMP,*
*Copy the branch instruction into this code.
                    LDA      INST,*
                    STA      BRAN_INST
*Simulate the state of the process by restoring it's registers.
                    LDA      LB%+STARTUP_FAULT_KEYS,*
                    TAK
                    RRST     LB%+STARTUP_RSAV_AREA,*
*Execute the actual branch instruction here.
BRAN INST           BSZ      1
                                            The branch instruction
                                            is put here.
                    DAC      BRAN_TARGET
                                            Branch address.
*Branch was not taken. Next instruction is 2 more than the current pc.
                    LDL      LB%+STARTUP_BRKPT_ADDR
                    ADL      ′ =2L
                    PRTN
*Branch was taken. The word number of the branch address is the next instruction
to execute within the current segment.
BRAN_TARGET         LDL      INST,*
                                            Word number from the branch.
                    LDA      LB%+STARTUP_BRKPT_ADDR
                                            Segment from brkpt address.
                    PRTN
```

As indicated in step 228, where the local simulation does not result in a branch, flow control is passed to step 230, while if the simulation does result in a branch, flow control is passed to step 232. There, the debugger identifies the operand of the original branch instruction and retains that operand as indicative of the next predicted instruction. For example, if the operand of the replaced instruction indicated that the branch address was 8324, that value would be retained as the prediction address.

Where flow control is transferred to step 230, the debugger predicts that user process flow control will not branch after execution of the replaced code. Accordingly, the prediction element retains the incremented user stack frame program counter as the predicted address. For example, if the program counter from the user stack frame is 4010 and no branch is predicted, the prediction element will retain 4012 (i.e., 4010+2) as the predicted address.

In step 234, the debugger invokes the breakpoint element 42 to set a breakpoint at the predicted address of the next executed instruction. Thus, in the examples immediately above, where a branch has been predicted, the breakpoint element 42 is invoked to set a breakpoint at address 8324. While, if no branch has been predicted, Those skilled in the art will readily appreciate that the aforementioned sequence is similarly applicable to next instruction prediction for other flow control instructions, e.g., skip instructions.

A preferred software embodiment of next instruction prediction for other flow control instructions is provided in Appendix C (available in the application file history) at pp. 360–367, 484–496, and 1039–1045.

Described above is a preferred embodiment of a system for facilitating the isolation and correction of errors in instruction processing on a digital computer. While the illustrated system is particularly suited for use with multiprogrammable machines having embedded operating systems and hardware controlled process exchange (e.g., systems of the type provided by prime Computer, Inc. Series 50 computers), the teachings provided herein will be recognized by those skilled in the art to have broad application. Further, skilled artisans will recognize that the aforementioned description of the illustrated embodiment is exemplary only; modification, addition, or deletions from that description does not detract from the scope of the invention described and claimed in this application for patent.

Accordingly, what is claimed is:

1. A multiprogrammable digital data processor comprising:
  A. memory means having addressable locations for storing process code signals associated with each of one or more processes, wherein the process code signals associated with each process include signals representative of at least one of instructions, data, and state values of that process,
  B. breakpoint means coupled with the memory means for replacing therein a signal representative of a selected instruction with a selected interrupt signal,
  C. scheduler means for scheduling one of said processes for execution during a designated time interval,
  D. first central processing unit means coupled to the memory means and to the scheduler means for normally executing the scheduled one of said processes during the designated time interval,
  E. debugger means coupled to the first central processing unit means for selectively
    i. suspending processing of the scheduled process by the first central processing unit means,
    ii. permitting selective access to locations of said memory means for at least one of modifying and outputting values of signals stored in those accessed locations,
  F. said debugger means further including simulation means for generating simulation code signals, representative instructions for simulating the selected replaced instruction, and
  G. said debugger means further includes restart means for reactivating the suspended process for execution of at least said simulation code.

2. A multiprogrammable digital data processor according to claim 1, wherein said simulation means includes means coupled with said memory means for including said simulation code signals in the process code signals associated with the suspended process.

3. A multiprogrammable digital data processor according to claim 1, wherein said debugger means includes means coupled with said scheduler means for inhibiting the scheduling for execution of any of said other processes.

4. A multiprogrammable digital data processor according to claim 3 wherein said restart means includes means for re-enabling said scheduler means to schedule for execution said other processes.

5. A multiprogrammable digital data processor according to claim 1, wherein
  A. said memory means includes means for storing fault instructions including at least a start-up instruction sequence,
  B. said first central processing unit means includes means for executing said selected interrupt signal for generating a selected fault signal, and wherein said digital data processor further comprises
  C. fault handler means coupled to said first central processing unit means and to said memory means, and responsive to said selected fault signal, for executing said start-up instruction sequence to generate a start-up signal.

6. A multiprogrammable digital data processor according to claim 5 wherein said fault handler means further comprises means for generating and storing a first return code signal representative of a location within said memory means of said selected interrupt signal.

7. A multiprogrammable digital data processor according to claim 6, wherein said debugger means includes means for modifying said first return code signal.

8. A multiprogrammable digital data processor according to claim 6 further comprising start-up means coupled with said fault handling means and responsive to said start-up signal for generating a notify signal for initiating operation of said debugger means.

9. A multiprogrammable digital data processor according to claim 8, wherein
  A. said memory means includes means for storing signals representative of instructions for execution by said start-up means,
  B. said start-up means is coupled to said memory means for executing those start-up instruction-representative signals, and
  C. said debug means includes means for modifying those start-up instruction-representative signals for including therein a signal representative of a location of said simulated code signals.

10. A multiprogrammable digital data processor according to claim 1 wherein said debugger means comprises single-step means coupled to said memory means for reinstituting said replaced instruction and for replacing a next executed instruction with said selected interrupt instruction.

11. A multiprogrammable digital data processor according to claim 10 wherein said single-step means comprises next instruction prediction means for determining a location within said memory means of said next executed instruction.

12. A multiprogrammable digital data processor according to claim 11 wherein said next instruction prediction means includes means for simulating execution of the replaced instruction and for determining therefrom the location of the next execute instruction.

13. A multiprogrammable digital data processor according to claim 1, wherein
  A. said scheduler means includes means for scheduling a second one of said processes for execution during said designated time interval, said processor further including
  B. second central processing unit means coupled to the memory means and to the scheduler means for normally executing said second scheduled process during the designated time interval, and wherein
  C. said debugger means is coupled to said second central processing unit means for selectively suspending processing of the second scheduled process by the second central processing unit means.

14. A multiprogrammable digital data processor according to claim 1, wherein said memory means includes
  A. resident memory means for storing for rapid access a first subset of said process mode signals,
  B. virtual memory means for storing for paged access a second subset of said process code signals, and
  C. said breakpoint means includes means for generating and storing in said resident memory means a virtual breakpoint signal indicative of a breakpoint in said second subset of process code signals.

15. A multiprogrammable digital data processor according to claim 14, further comprising
  A. paging means for reading said second subset of process code signals into said main memory means, and for generating a paging signal indicative thereof, wherein said B. first central processor unit means includes means selectively responsive to said paging signal for executing said virtual memory breakpoint signal, and C. said breakpoint means includes means responsive to execution of said virtual memory breakpoint signal for replacing in said main memory a signal representative of a selected instruction with a selected interrupt signal.

16. A multiprogrammable digital data processor comprising:

A. memory means having addressable locations for storing process code signals associated with each of one or more processes, wherein the process code signals associated with each process include signals representative of at least one of instructions, data, and state values of that process, B. breakpoint means coupled with the memory means for replacing therein a signal representative of a selected instruction with a selected interrupt signal, C. scheduler means for scheduling one of said processes for execution during a designated time interval, D. first central processing unit means coupled to the memory means and to the scheduler means for normally executing the scheduled one of said processes during the designated time interval, E. said memory means further includes means for storing debugger process signals for placing said first central processing unit in a debugging operating mode for selectively i. suspending processing of the scheduled process by the first central processing unit means, ii. permitting selective access to locations of said memory means for at least one of modifying and outputting values of signals stored in those accessed locations, F. said debugger means further including simulation means for generating simulation code signals representative instructions for simulating the selected replaced instruction, and G. said debugger means further restart means for reactivating the suspended process for execution of at least said simulation code.

17. A method of operating a multiprogrammable digital data processor, said method comprising the steps of A. storing in a first storage element process code signals associated with each of one or more processes, wherein the process code signals associated with each process include signals representative of at least one of instructions, data, and state values of that process, B replacing in said first storage element a signal representative of a selected instruction with a selected interrupt signal, C. scheduling one of said processes for execution during a designated time interval, D. executing the scheduled one of said processes during the designated time interval, E. suspending processing of the scheduled process, and F. permitting selective access to locations of said first storage element for at least one of modifying and outputting values of signals stored in those accessed locations, G. generating simulation code signals representative instructions for simulating the selected replaced instruction, and H. reactivating the suspended process for execution of at least said simulation code.

18. A method of operating a multiprogrammable digital data processor according to claim 17, further comprising the step of including said simulation code signals in the process code signals associated with the suspended process.

19. A method of operating a multiprogrammable digital data processor according to claim 17, further including the step of inhibiting the scheduling for execution of any of said other processes.

20. A method of operating a multiprogrammable digital data processor according to claim 19 further including the step of re-enabling the scheduling for execution of said other processes.

21. A method of operating a multiprogrammable digital data processor according to claim 17, further comprising the steps of A. providing in said first storage means at least a start-up instruction, B. executing said selected interrupt signal for generating a selected fault signal, C. responding to said selected fault signal for executing said start-up instruction to generate a start-up signal.

22. A method of operating a multiprogrammable digital data processor according to claim 21 comprising the further steps of generating and storing a first return code signal representative of a location within said first storage element of said selected interrupt signal.

23. A method of operating a multiprogrammable digital data processor according to claim 22, including the further step of modifying said first return code signal.

24. A method of operating a multiprogrammable digital data processor according to claim 23 comprising the further step of responding to said start-up signal for generating a notify signal for initiating steps said aforementioned steps (E) through (H).

25. A method of operating a multiprogrammable digital data processor according to claim 17 comprising the further steps of reinstituting a replaced instruction and replacing a next executed instruction with said selected interrupt instruction.

26. A method of operating a multiprogrammable digital data processor according to claim 25 wherein said replacing step comprises a next instruction prediction step for determining a location within said first storage element of said next executed instruction.

27. A method of operating a multiprogrammable digital data processor according to claim 26 wherein said next instruction prediction steps includes the further step of simulating execution of the replaced instruction and for determining therefrom the location of the next executed instruction.

28. A method of operating a multiprogrammable digital data processor according to claim 17, comprising the further steps of A. scheduling a second one of said processes for execution during said designated time interval, B. executing said second scheduled process during the designated time interval, C. suspending processing of the second scheduled process by the second central processing unit means.

* * * * *